(12) United States Patent
Foltz et al.

(10) Patent No.: US 8,024,546 B2
(45) Date of Patent: Sep. 20, 2011

(54) OPPORTUNISTIC PAGE LARGIFICATION

(75) Inventors: Forrest C. Foltz, Redmond, WA (US); David N. Cutler, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 12/257,091

(22) Filed: Oct. 23, 2008

(65) Prior Publication Data
US 2010/0106930 A1  Apr. 29, 2010

(51) Int. Cl.
*G06F 12/10* (2006.01)
(52) U.S. Cl. .................................... 711/206; 711/209
(58) Field of Classification Search .................... None
See application file for complete search history.

(56) References Cited

U.S. PATENT DOCUMENTS

| | | | |
|---|---|---|---|
| 5,475,827 A | 12/1995 | Lee | |
| 6,112,285 A | 8/2000 | Ganapathy | |
| 6,182,089 B1 | 1/2001 | Ganapathy | |
| 6,523,104 B2 * | 2/2003 | Kissell | 711/206 |
| 6,715,057 B1 | 3/2004 | Kessler et al. | |
| 6,760,805 B2 | 7/2004 | Lasser | |
| 6,965,540 B2 | 11/2005 | Farrell | |
| 7,243,208 B2 | 7/2007 | Ito | |
| 7,752,417 B2 * | 7/2010 | Manczak et al. | 711/209 |
| 2004/0117594 A1 | 6/2004 | Vanderspek | |
| 2005/0097298 A1 | 5/2005 | Cohen | |
| 2006/0288187 A1 | 12/2006 | Burugula | |
| 2007/0136506 A1 | 6/2007 | Traut | |
| 2008/0133873 A1 | 6/2008 | Anand | |

OTHER PUBLICATIONS

International Search Report and Written Opinion of PCT/US2009/058511, mailed Apr. 16, 2010.
Features and Benefits—Scalability, http://www.sun.com/software/solaris/9/sparc/solaris9_features_scalability.xml, Jul. 4, 2008.
Large Page Support in the Linux Kernel, http://lwn.net/Articles/6969/, Jul. 4, 2008.
PCT Notification of Transmittal of The International Search Report and the Written Opinion of the International Searching Authority, or the Declaration, 10 pages, mailed Apr. 16, 2010, regarding International Application No. PCT/US2009/058511, International Filing Date Sep. 26, 2009, Applicant's File Reference 324487-02WO.

* cited by examiner

*Primary Examiner* — Gary Portka
(74) *Attorney, Agent, or Firm* — Shook Hardy & Bacon LLP

(57) ABSTRACT

Page tables in the last level of a hierarchical page table system are scanned for candidate page tables. Candidate page tables are converted to large pages, having a page table entry in a level before the last level of the hierarchical page table system adjusted to be associated with the newly created large page. Upon receiving a notification that a large page is to be converted into a page table, a new page table is created. Each entry in the new page table is associated with a small segment of memory in the large page and an entry in a page table one level before the last level in a hierarchical page table system is adjusted to be associated with the new page table.

20 Claims, 5 Drawing Sheets

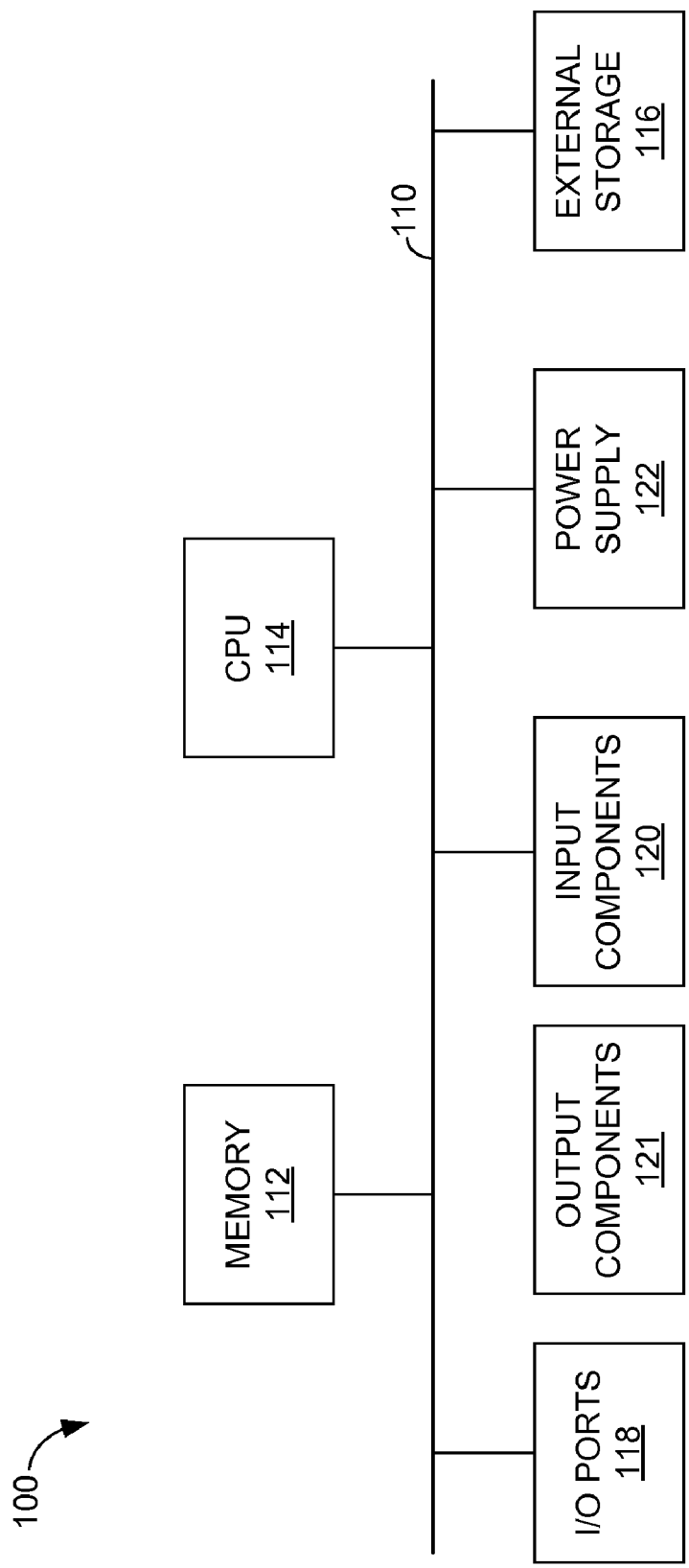

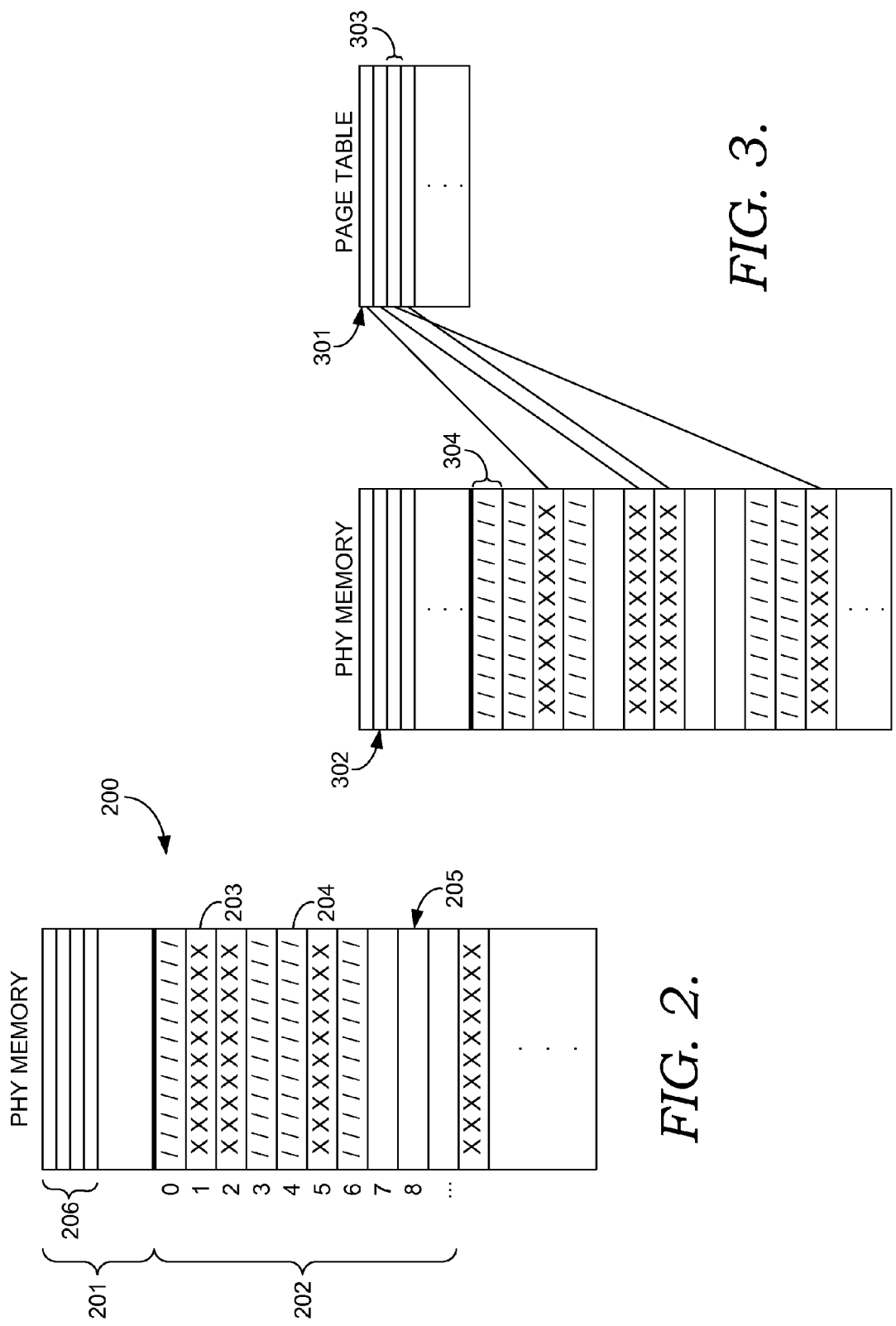

OPPORTUNISTIC PAGE LARGIFICATION

BACKGROUND

Processes executing on computing devices often require data to be used in computations. This data is typically stored by the operating system in memory, such as RAM. This memory is broken up into chunks called pages. Each page is associated with a unique address. When processes require data, the data is referenced by its unique address, and the address is used to lookup the physical location of the page to return the data. One common way this address to physical location translation is performed is by traversing a page table hierarchy. Such hierarchies trade off the size of the pages that are addressed with the number of levels in the hierarchy. However, the size of the pages also dictates how efficiently the memory space is used, with larger pages being less efficient. Therefore, there is a direct trade off between space efficiency (due to page size) and translation time efficiency (due to the number of pages in the page table hierarchy).

An additional factor in determining the efficiency of a page table system consists of the needs of the processes. If processes typically require large amounts of data, then larger pages may in fact be efficient in terms of memory usage. However, if processes typically require small amounts of data, then smaller pages will be more efficient. Since processes of both types tend to operate on computing devices, a method of dynamically supporting both would lead to greater efficiency. Operating system support for large pages is also not as robust in computing devices as support for smaller sized pages. This leads to an additional challenge in using large pages.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to scanning the last level in a page table hierarchy to locate candidate page table entries (PTEs) for conversion to large page mappings. Once candidate PTEs are located, these candidate PTEs are converted to large pages by locating a large, contiguous segment of physical memory, transferring the data associated with all the PTEs in the candidate page table page to the located segment of memory, and then adjusting a PTE in a page table page one level before the last level of the page table hierarchy to be associated with the newly created large page. In some embodiments, when a notification is received, indicating a large page that is to be converted back to small pages, a new page table page is created. Each PTE in the new page table page is associated with a small segment of the large page and a PTE in the page table one level before the last level of the hierarchical page table system is adjusted to be associated with the new page table page.

BRIEF DESCRIPTION OF THE DRAWINGS

The present invention is described in detail below with reference to the attached drawing figures, wherein:

FIG. 1 depicts a block diagram of an exemplary computing device suitable for use in implementing the present invention;

FIG. 2 is a diagram of a typical physical memory layout as used by operating systems and user processes;

FIG. 3 depicts an exemplary relationship between a page table and physical memory;

DETAILED DESCRIPTION

Figure 4:
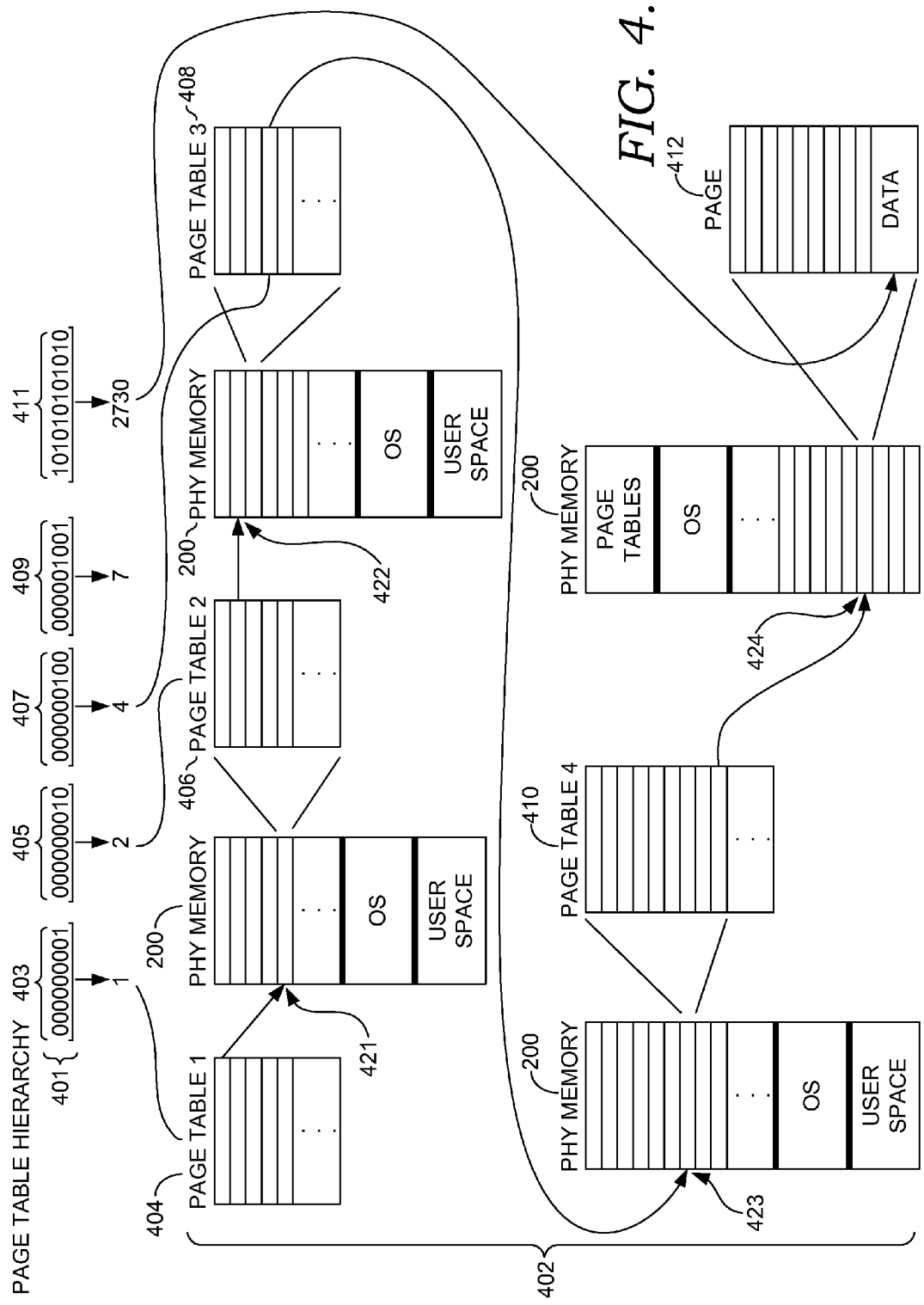
FIG. 4 depicts an exemplary hierarchical page table system.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to opportunistically locating groups of PTEs that could be converted into a large page and performing a conversion. Additionally, once a page table page has been converted into a large page, the reverse process may be performed in reaction to a notification from the operating system.

In accordance with some embodiments of the present invention, the memory subsystem of a computing device manages a shared memory resource. Data required for computation by one or more processes are stored in the shared memory resource. Typically, processes executing on the computation device are not aware of the physical location of the data. Instead, these processes are presented with an address space mapping addresses to physical locations in memory. The one or more processes executing on the computation device use the address to refer to data required for computation. The memory subsystem of the computing device handles the translation from address to physical location, performing address lookups.

In modern computing devices, the physical memory is divided into segments referred to as pages. These pages represent the minimum data size that can be represented by the page table hierarchy. Page tables are used by the memory subsystem of the computing device to map virtual addresses to physical locations in memory. There are a number of possible layouts for page table systems; however, the most common mappings from addresses to physical memory locations use multiple, hierarchical page table lookups, which are described in detail below. These hierarchies allow fixed address sizes (typically measured in bits) to address large amounts of physical memory. Such hierarchical table lookups require multiple memory accesses to locate a physical page associated with a given virtual address. The more levels in the hierarchical page table system, the more expensive data access operations are in terms of time for the address to physical memory translation. However, there is also a tradeoff between the number of levels in the page table hierarchy and the page size. Fewer levels in the page table hierarchy implies larger page size. Therefore, for applications using small segments of data, small page sizes and therefore deeper hierarchies allow less memory waste. However, for applications using a large amount of data, larger page sizes will reduce the number of page table lookups required to locate the required data, and therefore increase the lookup efficiency.

When a particular piece of data is no longer needed or has not been accessed for a threshold period of time, it is common for memory subsystems to save that piece of data to disk, freeing up memory for data that is more frequently or currently needed. This processes is called swapping out memory. However, many memory subsystems can only swap out some fixed page size. Therefore, any mechanism that creates pages larger than this fixed size would have to have the capability to break the large pages into multiple smaller-sized pages in the event some part of the large page must be swapped out. There are many other additional situations wherein a large page would need to be broken up into smaller-sized pages by a memory subsystem.

Accordingly, an embodiment of the invention is directed to computer-readable storage media embodying computer-useable instructions for performing a method of converting a plurality of small pages associated with one or more processes operating on a computing device into a large page. Each of the pages is associated with an entry in a page table from a hierarchical page table system containing at least two levels of page tables. The method includes scanning the last level of the hierarchical page table system for candidate PTEs, which are page tables with at least a threshold of entries associated with pages. The method then locates a physically contiguous memory segment large enough to store each of the pages associated with the entries in the candidate page table and copies the segments of memory in each of the pages to the located memory segment. The method adjusts a page table entry in a page table one level before the last level in the hierarchical page table system to be associated with the newly created large page.

According to other embodiments, the invention is directed to computer-readable media storing computer-executable instructions embodying a method of converting a large page into a plurality of small pages associated with one or more processes executing on a computer system. Each of the pages is associated with an entry of a page table in a hierarchical page table system. The method includes receiving an operating system notification indicating a large page that is to be converted into a group of small pages. Upon receiving the notification, a new page table is created and the entries in the new page table are associated with small segments of the large page. The method includes adjusting an entry from a page table one level before the last level of the hierarchical page table system to be associated with the new page table.

According to a further embodiment, the invention is directed to a computer-readable media storing computer-executable instructions embodying a method of scanning a last level of a hierarchical page table system, containing at least two levels of page tables, in each of a plurality of address spaces associated with one or more processes executing on a computer system. This scanning involves attempting to identify candidate page tables, which are page tables for which each of the entries are associated with one or more segments of physical memory. The method further includes locating a memory segment composed of contiguous segments of physical memory large enough to store each of the plurality of segments of physical memory associated with all the entries in a candidate page table and copying those segments of physical memory into the newly located memory segment. The method frees the segment of memory containing the candidate page table and adjusts a page table entry in a page table one level before the last level in the hierarchical page table system that was associated with the candidate page table to be associated with the newly located segment of memory, called a large page. The method further includes receiving an indication from a memory subsystem incapable of swapping out large pages that indicates one or more segments of a large page is to be swapped out. The method further includes creating a new page table, with each entry in the new page table being associated with a segment of the large page containing the segment or segments that are to be swapped out. The method further includes adjusting a page table entry in a page table one level before the last level of the hierarchical page table system that was previously associated with the large page to be associated with the new page table.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more external storage components 116, input/output (I/O) ports 118, input components 120, output components 121, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server,"

"laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile memory. Exemplary hardware devices include solid-state memory, such as RAM. External storage 116 includes computer-storage media in the form of non-volatile memory. The memory may be removable, nonremovable, or a combination thereof. Exemplary hardware devices include solid-state memory, hard drives, optical-disc drives, etc. Computing device 100 includes one or more processors that read data from various entities such as memory 112, external storage 116 or input components 120. Output components 121 present data indications to a user or other device. Exemplary output components include a display device, speaker, printing component, vibrating component, etc.

I/O ports 118 allow computing device 100 to be logically coupled to other devices including input components 120 and output components 121, some of which may be built in. Illustrative components include a microphone, joystick, game pad, satellite dish, scanner, printer, wireless device, etc.

According to an embodiment of the invention, computing device 100 could be used as a hypervisor, which is a virtualization platform that abstracts the physical components of the computing device 100, such as the input components 120 and the memory 112 from the operating system or system running on the computing device 100. Such hypervisors allow multiple operating systems run on a single computing device 100 through such abstraction, allowing each independent operating system to have access to its own virtual machine. In hypervisor computing devices, the overhead associated with traversing page table hierarchies is even larger and the benefits of using large pages are even greater than in systems running single operating systems that have direct access to the components of the computing device 100.

Turning to FIG. 2, a physical memory 200, such as a RAM, is divided into a number of sections. According to some embodiments of the invention, the memory is divided into two main partitions, an operating system memory space 201 and a user memory space 202. A memory subsystem of an operating system executing on the computing device manages the physical memory 200, allowing user applications to use portions of user memory space 202. Applications may not have access to contiguous memory locations, however. Referring to FIG. 2, according to some embodiments of the present invention, the user memory space 202 is divided into pages (represented by boxes), which are distributed between two hypothetical applications for illustration purposes only and not limitation: application 1 space is represented by x's (e.g., memory segment 203) and application 2 space is represented by /'s (e.g., memory segment 204). Free memory pages are clear in the diagram (e.g., memory segment 205). The operating system memory space 201 can be used for a number of purposes, one of which is to store the page tables 206 that contain the mapping from the address space to physical memory. For applications, these mappings associate pages in the user memory space 202 where data is stored with addresses.

As shown in FIG. 3, according to an embodiment of the present invention, a page table 301 includes entries 303, each of which being associated with a particular page in the user memory space, stored in physical memory 304. Note that entries 303 in the page table 301 may not necessarily be associated with contiguous pages 304 in the physical memory.

Referring now to FIG. 4, according to various embodiments of the present invention, addresses 401 are represented by strings of bits. These addresses are mapped through a hierarchical page table system 402. By way of example and not limitation, consider a 48-bit addressing scheme 401 and a four-level hierarchical page table system 402. The 48-bit address 401 is divided into five sections. A first nine bits 403 are used to index into a first page table 404. The entry located in the first page table 404 by the first nine bits 403 of the address 401 is associated with a segment of memory 422 storing a second page table 406. The second nine bits 405 index into the second page table 406. The entry located in the second page table 406 is associated with a segment of memory 422 containing a third page table 408. The third nine bits 407 of the address 401 index into the third page table 408. The entry located in the third page table 408 is associated with a segment of memory 423 containing a fourth page table 410. The fourth nine bits 409 of the address 401 index into the fourth page table 410. The entry located in the fourth page table 410 is associated with a segment of memory 424 in user space memory containing a page 412. The last twelve bits 411 of the address 401 index into the page 412. The segment of memory in the page 412 at the index given by the last twelve bits 412 is the data referred to by the address 401. As can be seen there is at least one memory access per page table lookup in the process of looking up data addressed via a hierarchical page table system.

Those skilled in the art will recognize that the specific address sizes, number of page tables, number of levels in the page table hierarchical system, and size of pages can be varied. By way of example only and not limitation, page sizes can be 4 KB, 2 MB, or 1 GB. Address sizes can range, for instance, from 32 bits to 64 bits. Given the example in FIG. 4, each page table has 512 entries ($2^9$) and each page is 4 KB ($2^{12}$). It takes four page table lookups to locate data in a page. If all of the data associated with all 512 entries in a page table were to be combined in a single page, the resulting page (called a large page) would be 2 MB and would require only three page table lookups in the hierarchical page table system to locate.

Figure 5:
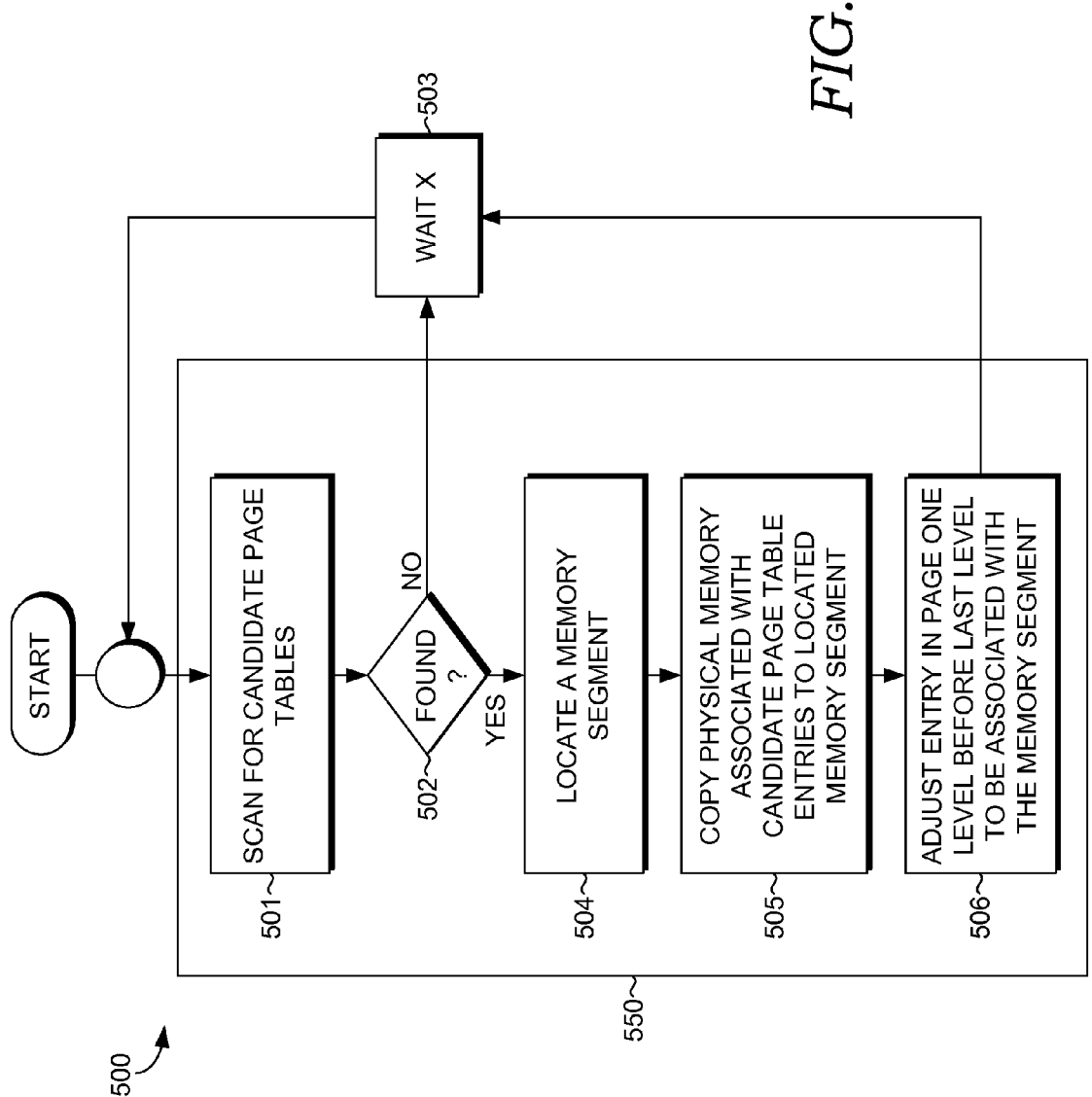
FIG. 5 is a flow diagram showing a method for finding candidate page tables for conversion into large pages and performing the conversion.

Turning to FIG. 5, a flow diagram is provided that illustrates a method 500 for finding a candidate page table to convert to a large page and so converting the page table (block 550 contains the steps of the method without the timeout portion shown in block 503, all discussed below). Shown at block 501, the last level of the page table hierarchical system is scanned for candidate page tables for conversion to large pages. For example, the last level of the page table hierarchy of FIG. 4, in which the fourth page table 410 exists, could be scanned for candidate page tables. One skilled in the art will recognize a wide variety of criteria could be used for determining whether a page table is a candidate for conversion to a large page. By way of example only and not limitation, such criteria could include finding a full page table or finding a page table with a threshold of entries full. A full page table is one wherein all the entries of the page table are associated with locations in physical memory. According to one embodiment of the invention, such scanning involves scanning through each of the page tables associated with the entries in page tables one level before the last level and examining the found last level page tables to see if they constitute a full page table. One skilled in the art will recognize that there are many ways a threshold could be defined, including but not limited to, a percentage of entries being associated with physical memory locations or a total number of entries associated with physical memory locations.

By scanning the last level in the hierarchical page table system (e.g., the level in which page table 410 is located in FIG. 4) one or more candidate page tables may be identified (see block 502). If no candidate page table has been identified, then there is a time delay 503 before another scan is performed at block 501. This time delay 503 is a parameter that could be adjusted by a programmer, system administrator, user, or anyone else with appropriate access to the system. If, however, a candidate page table has been identified, then a segment of contiguous memory large enough to store the data associated with each entry in the candidate page table is located, as shown at block 504.

In embodiments, locating a segment of memory involves scanning the physical memory for a sufficient number of contiguous segments of memory to store all of the entries associated with the candidate page table. Recall that a page table may not have contiguous entries that are associated with contiguous physical memory segments. However, when the entries in the candidate page table are converted to a large page, they must be stored in the order of the entries in the page table with which they are associated. According to one embodiment of the invention, locating a memory segment is simply a matter of scanning the physical memory and finding a large contiguous segment of memory (e.g. 2 MB). In some embodiments, this scanning could be performed by scanning a page frame number database containing the state of all physical pages in the system. Additionally, the large contiguous segment of memory might be restricted to begin on a predetermined byte-boundary. By way of example and not limitation, considering the example above using 512 4 KB small-sized pages to combine into a large page of 2 MB, the predetermined byte boundary could be a 2 MB byte-boundary. Those skilled in the art will recognize that many other values for the predetermined byte-boundary could be used. According to another embodiment of the invention, if not enough contiguous segments of memory can be found, then a memory management subroutine is activated that actively creates a large contiguous segment of memory by moving stored data to free segments away from a particular location in memory, and adjusting their respective page table entries. In this way a large contiguous segment of memory is created for use in the large page table conversion.

Once a contiguous segment of memory of sufficient size has been located or created, all of the physical segments of memory associated with the entries in the candidate page table are copied in order to the located memory segment, as shown at block 505. In one embodiment of the present invention, as the physical segments of memory are copied into the located segment, the original location of physical memory is freed. In another embodiment of the invention, the original memory locations of each of the memory segments associated with each of the entries of the candidate page table also maintain their copies of the data.

As shown at block 506, a page table entry one level before the last level of the hierarchical page table system (e.g., page table 408 of FIG. 4) is associated with the new large page. In one embodiment of the invention, the converted page table is freed and the page table entry from one level before the last level in the hierarchical page table system that was associated with the freed page table is adjusted to be associated with the new large page. After converting candidates to large pages, there is a time delay at block 503 before another scan for new candidate page tables is started. This time delay at block 503 is a parameter that could be adjusted by a programmer, system administrator, user, or any one else with appropriate access to the system.

Figure 6:
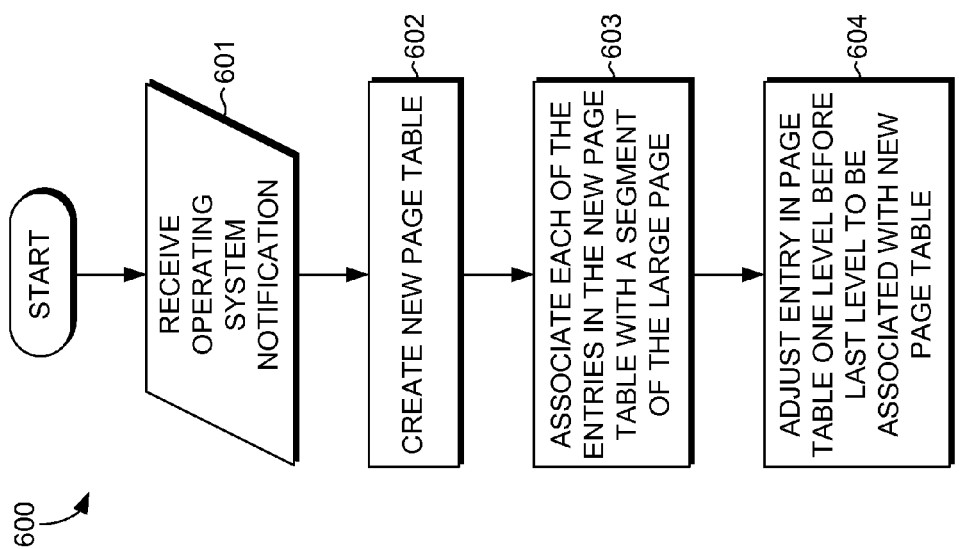
FIG. 6 is a flow diagram showing a method for receiving a notification that a large page is to be converted into a page table associated with small pages and performing the conversion.

Turning to FIG. 6, a flow diagram is provided that illustrates a method 600 for converting a large page into page table entries associated with multiple smaller-sized pages. According to one embodiment of the present invention, an operating system notification is received at block 601 identifying a large page to be converted to small pages. One skilled in the art will recognize that there are many events that might trigger such a notification. By way of example only and not limitation, such events include a segment of the large page being scheduled for swapping out to disk in a system with an operating system incapable of swapping out large pages and the page table entries associated with memory belonging to an application memory space that is being destroyed.

Upon receiving a notification indicating a large page to be converted, a new page table is created as shown at block 602. According to one embodiment of the invention, this creation involves allocating memory in the operating system memory space for a new table. Once the page table is created, each entry in the new page table is associated with one smaller-sized segment of the large page at block 603, until all of the segments of the large page are associated with some entry in the new page table. Continuing the example of FIG. 4, each of the 512 page table entries in the new page table would be associated with one 4 KB segment of the large page.

Finally, a page table entry from one level before the last level of the hierarchical page table system (e.g., the level in which page table 408 is located in FIG. 4) is adjusted to be associated with the new page table, as shown in block 604. According to one embodiment of the invention, the entry from the page table one level before the last level of the hierarchical page table system associated with the new page table was the entry previously associated with the large page.

Figure 7:
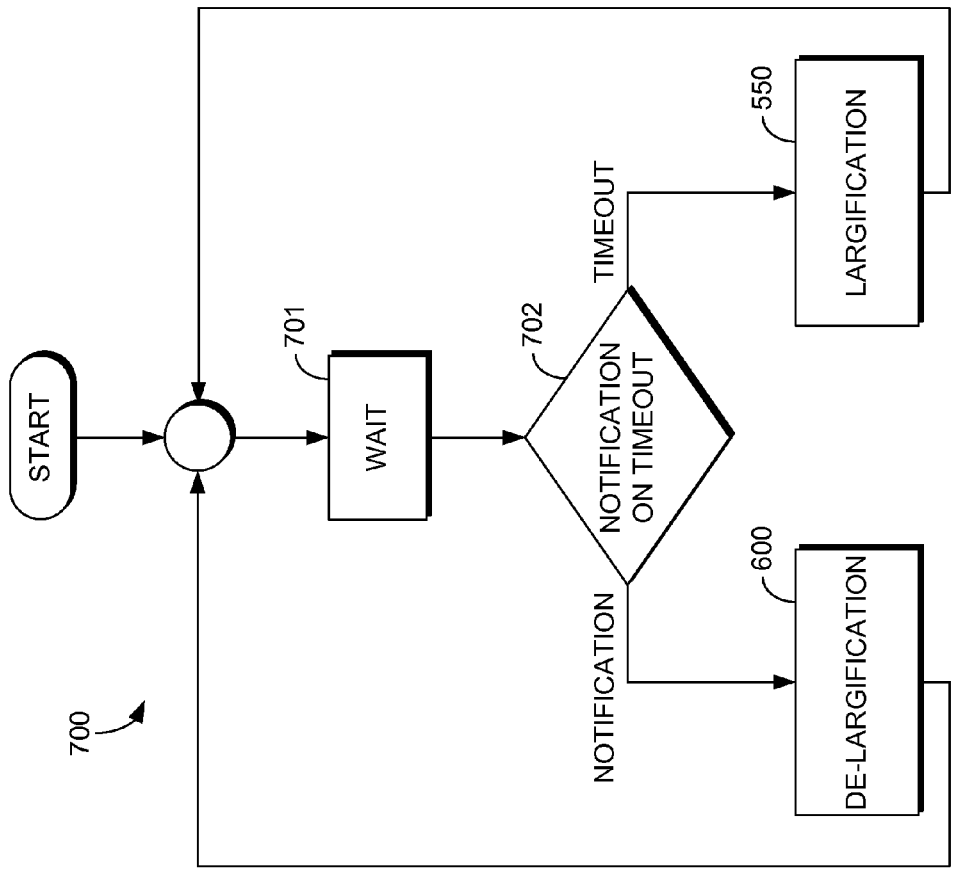
FIG. 7 is a flow diagram showing a method for either receiving a notification that a large page is to be converted to a page table associated with small pages, or receiving a timeout indicating it is time to scan for candidate page tables for conversion to large pages.

According to a further embodiment of the invention, FIG. 7 presents a method 700 of converting a page table into a large page and converting large pages into page tables associated with numerous smaller-sized pages. First the method involves waiting for an event, as shown at block 701. By way of example and not limitation, the event could be either a timeout or an operating system notification. One skilled in the art would recognize that there are numerous other events that could trigger either type of conversion. Once an event occurs, a decision is made. If the event was a timeout indicating that a time delay has expired 702, an attempt is made to convert a page table from the last level of a hierarchical page table system into a large page, for instance according to the method 550 of FIG. 5. This time delay is a parameter that could be adjusted by a programmer, system administrator, user, or any one else with appropriate access to the system. If the event is an operating system notification 702, then a large page is converted to a page table of entries pointing to smaller-sized pages, for instance according to the method 600 of FIG. 6. Upon completion of either the method of attempting to convert a page table to a large page, or the method of converting a large page to a page table with entries associated with numerous smaller-sized pages, a waiting period is entered again at block 701. This waiting period again expires either at the arrival of another operating system notification or the expiration of a time delay.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media storing computer-executable instructions for performing a method of converting a plurality of small pages associated with one or more processes executing on a computer system into a large page, each of the plurality of small pages being associated with one of a plurality of page table entries from a hierarchical page table system containing at least two levels of page tables, the method comprising:
scanning a last level of the hierarchical page table system for a page table in which each of at least a threshold of a plurality of entries are associated with one of a plurality of pages, resulting in the identification of a candidate page table;
locating a memory segment composed of a plurality of contiguous segments of physical memory, large enough to store each of the plurality of segments of physical memory associated with all of the plurality of entries of the candidate page table;
copying each of the plurality of segments of physical memory associated with all of the plurality of entries of the candidate page table into the memory segment composed of a plurality of contiguous segments of physical memory; and
adjusting a page table entry in a page table one level before the last level of the hierarchical page table system to be associated with the memory segment composed of a plurality of contiguous segments of physical memory.

2. The media of claim 1, wherein scanning a last level of the hierarchical page table system comprises selectively scanning each of a plurality of address spaces associated with the one or more processes executing on the computer system.

3. The media of claim 1, wherein the threshold of a plurality of entries is all of the plurality of entries.

4. The media of claim 1, wherein each of the plurality of entries of the candidate page table are associated with a single one of the one or more processes executing on the computer system.

5. The media of claim 1, wherein locating a memory segment composed of a plurality of contiguous segments of physical memory comprises copying data from a first location near an area of physical memory to a second location away from said area in order to create a plurality of contiguous segments of physical memory large enough to store each of the plurality of segments of physical memory associated with all of the plurality of entries of the candidate page table.

6. The media of claim 1, wherein the memory segment composed of a plurality of contiguous segments of physical memory is on a predetermined byte boundary.

7. The media of claim 1, wherein copying each of the plurality of segments of physical memory associated with all of the plurality of entries of the candidate page table further comprises freeing said plurality of segments of physical memory after they have been copied.

8. The media of claim 1, wherein said page table entry in a page table one level before the last level of the hierarchical page table system was previously associated with the candidate page table.

9. The media of claim 1, wherein adjusting a page table entry further comprises freeing a segment of memory containing the candidate page table.

10. One or more computer-readable media storing computer-executable instructions for performing a method comprising:
scanning a last level of a hierarchical page table system, containing at least two levels of page tables, in each of a plurality of address spaces associated with one or more processes executing on a computer system for a page table in which each of at least a threshold of a plurality of entries are associated with one of a plurality of segments of physical memory, resulting in the identification of a candidate page table;
locating a memory segment composed of a plurality of contiguous segments of physical memory, large enough to store each of the plurality of segments of physical memory associated with all of the plurality of entries of the candidate page table;
copying each of the plurality of segments of physical memory associated with all of the plurality of entries of the candidate page table into the memory segment composed of a plurality of contiguous segments of physical memory;
freeing a segment of memory containing the candidate page table;
adjusting a page table entry in a page table one level before the last level of the hierarchical page table system, said page table entry being previously associated with the candidate page table, to be associated with the memory segment composed of a plurality of contiguous segments of physical memory;
receiving an indication from a memory subsystem incapable of swapping out large pages, indicating a segment of a large page is to be swapped out;
creating a new page table with each entry in said new page table associated with a segment of the large page; and
adjusting a page table entry in a page table one level before the last level of the hierarchical page table system to be associated with the new page table, wherein said page table entry in a page table one level before the last level of the hierarchical page table system was previously associated with the large page.

11. The media of claim 10, wherein the hierarchical page table system contains four levels.

12. The media of claim 10, wherein each small page is 4KB.

13. The media of claim 10, wherein each large page is 2MB.

14. The media of claim 10, wherein the memory segment composed of a plurality of contiguous segments of physical memory is on a predetermined byte boundary.

15. The media of claim 14, wherein the predetermined byte boundary is 2MB.

16. The media of claim 10, wherein the page table hierarchical page table system is addressed according to a 64-bit architecture.

17. A computing device comprising a processor configured to perform a method of converting a plurality of small pages associated with one or more processes into a large page, each of the plurality of small pages being associated with one of a plurality of page table entries from a hierarchical page table system containing at least two levels of page tables, the method comprising:

scanning a last level of the hierarchical page table system for a page table in which each of at least a threshold of a plurality of entries are associated with one of a plurality of pages, resulting in the identification of a candidate page table;

locating a memory segment composed of a plurality of contiguous segments of physical memory, large enough to store each of the plurality of segments of physical memory associated with all of the plurality of entries of the candidate page table;

copying each of the plurality of segments of physical memory associated with all of the plurality of entries of the candidate page table into the memory segment composed of a plurality of contiguous segments of physical memory; and adjusting a page table entry in a page table one level before the last level of the hierarchical page table system to be associated with the memory segment composed of a plurality of contiguous segments of physical memory.

18. The device of claim 17, wherein the threshold of a plurality of entries is all of the plurality of entries.

19. The device of claim 17, wherein the memory segment composed of a plurality of contiguous segments of physical memory is on a predetermined byte boundary.

20. The device of claim 17, wherein copying each of the plurality of segments of physical memory associated with all of the plurality of entries of the candidate page table further comprises freeing said plurality of segments of physical memory after they have been copied.

* * * * *